United States Patent [19]

Hauck

[11] Patent Number: 5,694,886
[45] Date of Patent: Dec. 9, 1997

[54] PET KENNEL

[76] Inventor: Daniel Hauck, 948 Grant Ave., Box 243, Junction City, Kans. 66441

[21] Appl. No.: 714,196

[22] Filed: Sep. 16, 1996

[51] Int. Cl.[6] .................................................. A01K 13/00
[52] U.S. Cl. ................................. 119/497; 119/412
[58] Field of Search ............................. 119/400, 401, 119/496, 497, 453, 454, 412, 500

[56] References Cited

U.S. PATENT DOCUMENTS

| 3,084,667 | 4/1963 | Felhofer et al. | 119/19 |
| 3,524,431 | 8/1970 | Graham et al. | 119/19 |
| 3,885,525 | 5/1975 | Powell et al. | 119/17 |
| 4,066,042 | 1/1978 | Bright | 119/19 |
| 4,168,933 | 9/1979 | Kane | 414/498 |
| 4,171,683 | 10/1979 | Godin | 119/15 |
| 4,484,540 | 11/1984 | Yamamoto | 119/19 |
| 5,253,612 | 10/1993 | Goetz | 119/19 |

FOREIGN PATENT DOCUMENTS

| 2510958 | 2/1983 | France | 119/400 |

*Primary Examiner*—Edgar S. Burr
*Assistant Examiner*—Dave A. Ghatt
*Attorney, Agent, or Firm*—Hovey, Williams, Timmons & Collins

[57] ABSTRACT

A pet kennel is configured to present the appearance of a vehicle and includes a hingedly coupled front wall openable to expose a storage compartment. Ventilation openings are configured to present the appearance of vehicle windows. Wheels coupled with the bottom wall of the kennel housing rollably support the kennel.

9 Claims, 5 Drawing Sheets

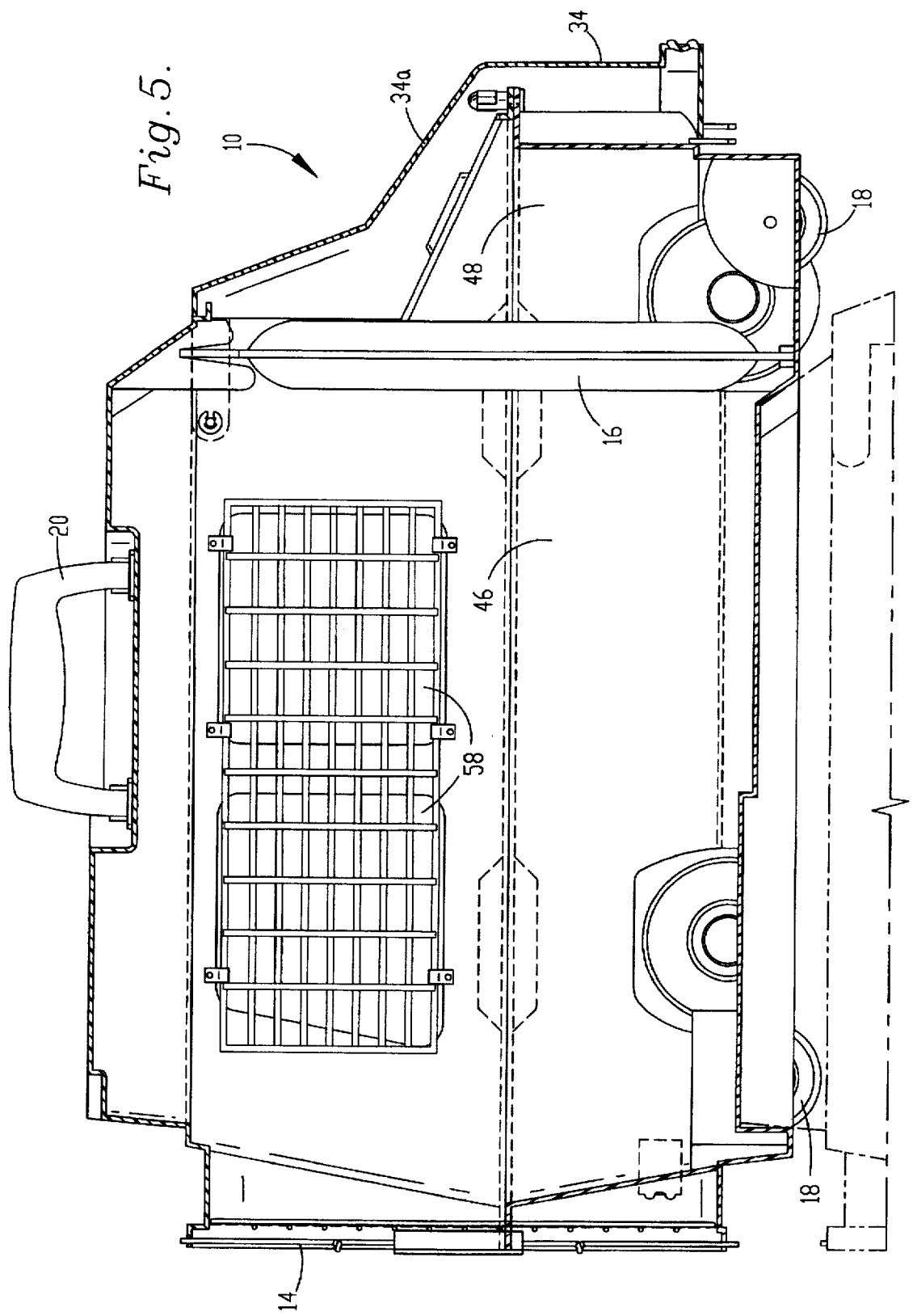

5,694,886

1

PET KENNEL

BACKGROUND OF THE INVENTION

1. Field of the Invention

The present invention is concerned with the field of pet kennels. In particular, the invention is concerned with a pet kennel configured to present the appearance of a vehicle including a hingedly coupled front openable to expose a storage compartment. Ventilation openings are configured to present the appearance of vehicle windows. Wheels coupled with the bottom wall of the kennel housing rollably support the kennel.

2. Description of the Prior Art

One type of pet kennel in the prior art is formed of synthetic resin material and includes upper and lower separable sections with a pet transfer opening defined in one end. A door configured as an open grill covers the pet transfer opening. This type of pet kennel is commonly used for transporting pets and as temporary housing for a pet while traveling, at shows and the like.

These prior art kennels are available in a variety of sizes depending upon the size of the pet but are otherwise uniform and very plain in appearance. Moreover, the prior art kennels may be stacked but they do not nest, and because of this, present the risk of a stacked kennel falling. Another disadvantage of the prior art kennels is that they must be carried or lifted onto a cart which can be awkward or difficult, especially with a large pet inside.

SUMMARY OF THE INVENTION

The present invention solves the prior art problems discussed above and provides a distinct advance in the state of the art. More particularly, the pet kennel hereof presents a striking appearance, reduces the risk of stacked kennels falling and is easily movable.

The preferred pet kennel of the present invention is configured to resemble a vehicle such as a van. The bottom wall includes wheels for rollably supporting the kennel and is also configured complementally with the top wall so that stacked kennels nest. In preferred forms, the front wall of the kennel is hingedly coupled with the housing in order to reveal the storage compartment for food, water and the like for the pet. Other preferred aspects of the present invention are disclosed further herein.

BRIEF DESCRIPTION OF THE DRAWINGS

FIG. 5 is a sectional view of the preferred pet kennel taken along line 5—5 of FIG. 3 with the top wall of another pet kennel shown in phantom lines for illustrating the nesting capability; and FIG. 6 is a partial cut away view of a hinge component of the pet kennel front wall.

DETAILED DESCRIPTION OF THE PREFERRED EMBODIMENT

Figure 1:
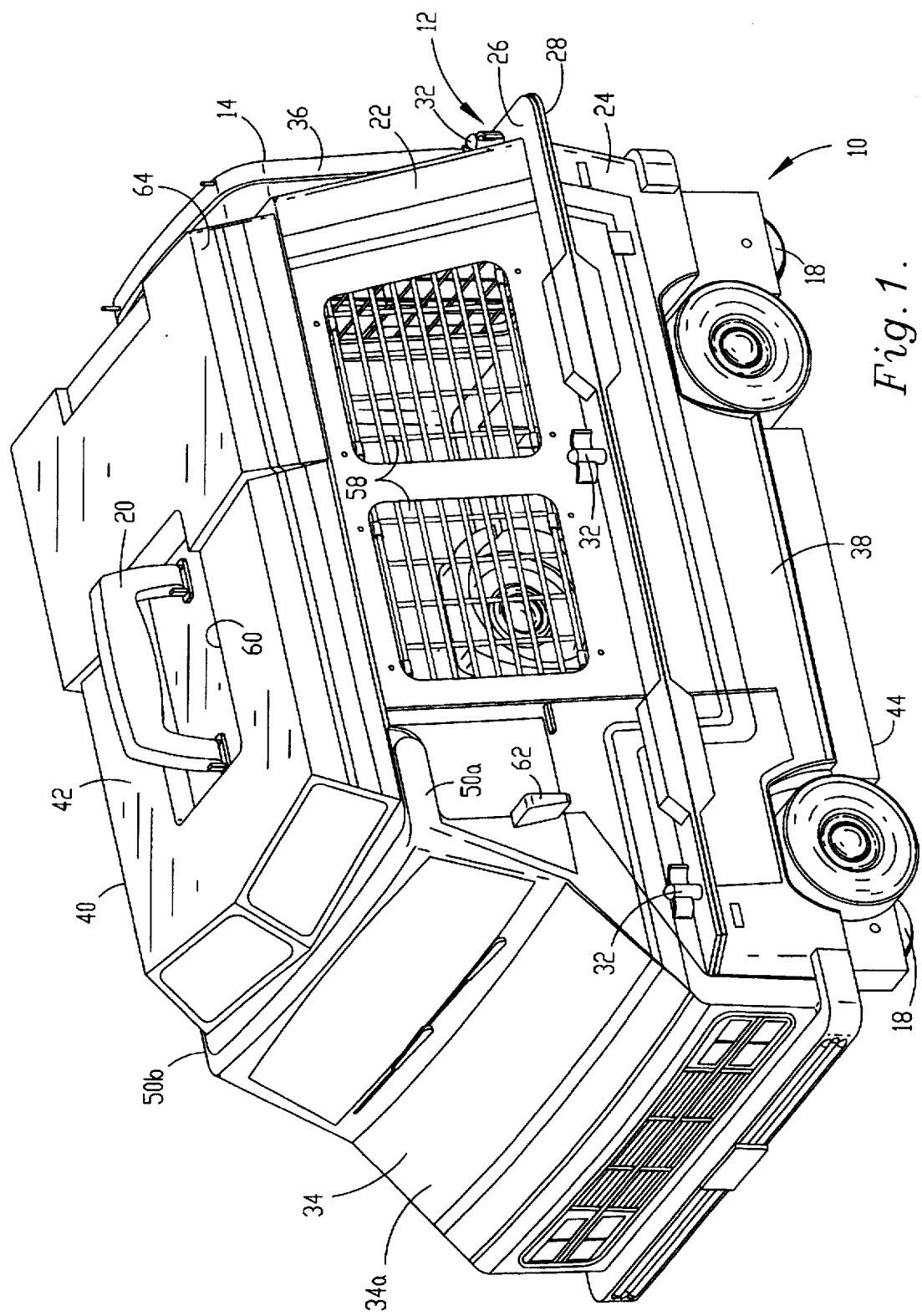
FIG. 1 is a left, top perspective view of the preferred pet kennel made in accordance with the present invention.

The drawing figures illustrate pet kennel 10 as the preferred embodiment of the present invention. Kennel 10 includes housing 12, access door 14, interior wall 16, wheels 18 and handle 20.

Figure 4:
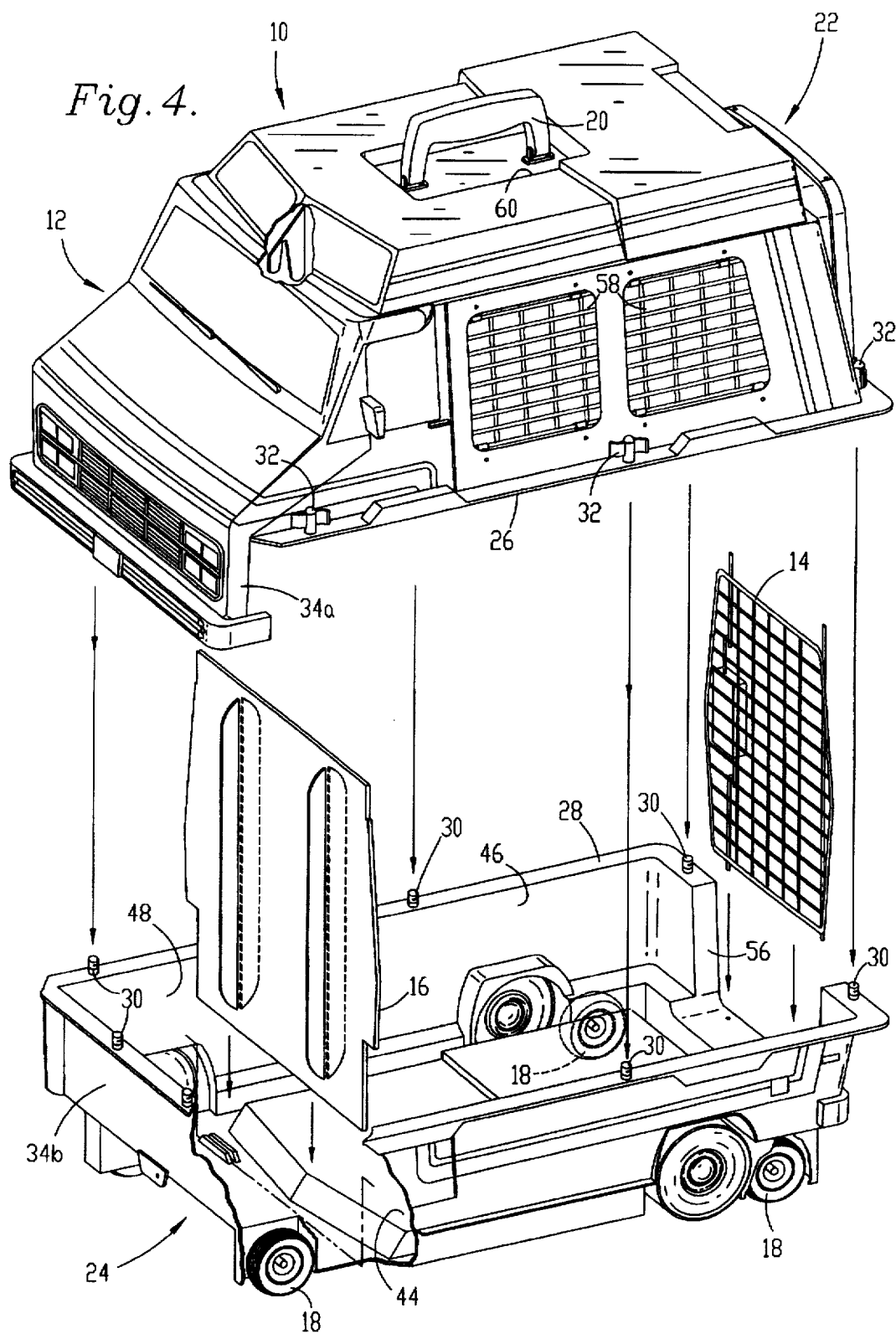
FIG. 4 is an exploded view of the pet kennel of FIG. 1.

Referring to FIG. 4, housing 12 is preferably composed of synthetic resin material such as moldable thermoplastic and includes upper section 22 and lower section 24. Upper section 22 includes marginal flange 26 configured to mate with corresponding marginal flange 28 of lower section 24. Flange 28 presents a plurality of upstanding threaded studs 30 which are received through corresponding openings in flange 26. Wing nuts 32 are threadably received on studs 30 to detachably hold together sections 22 and 24.

Figure 2:
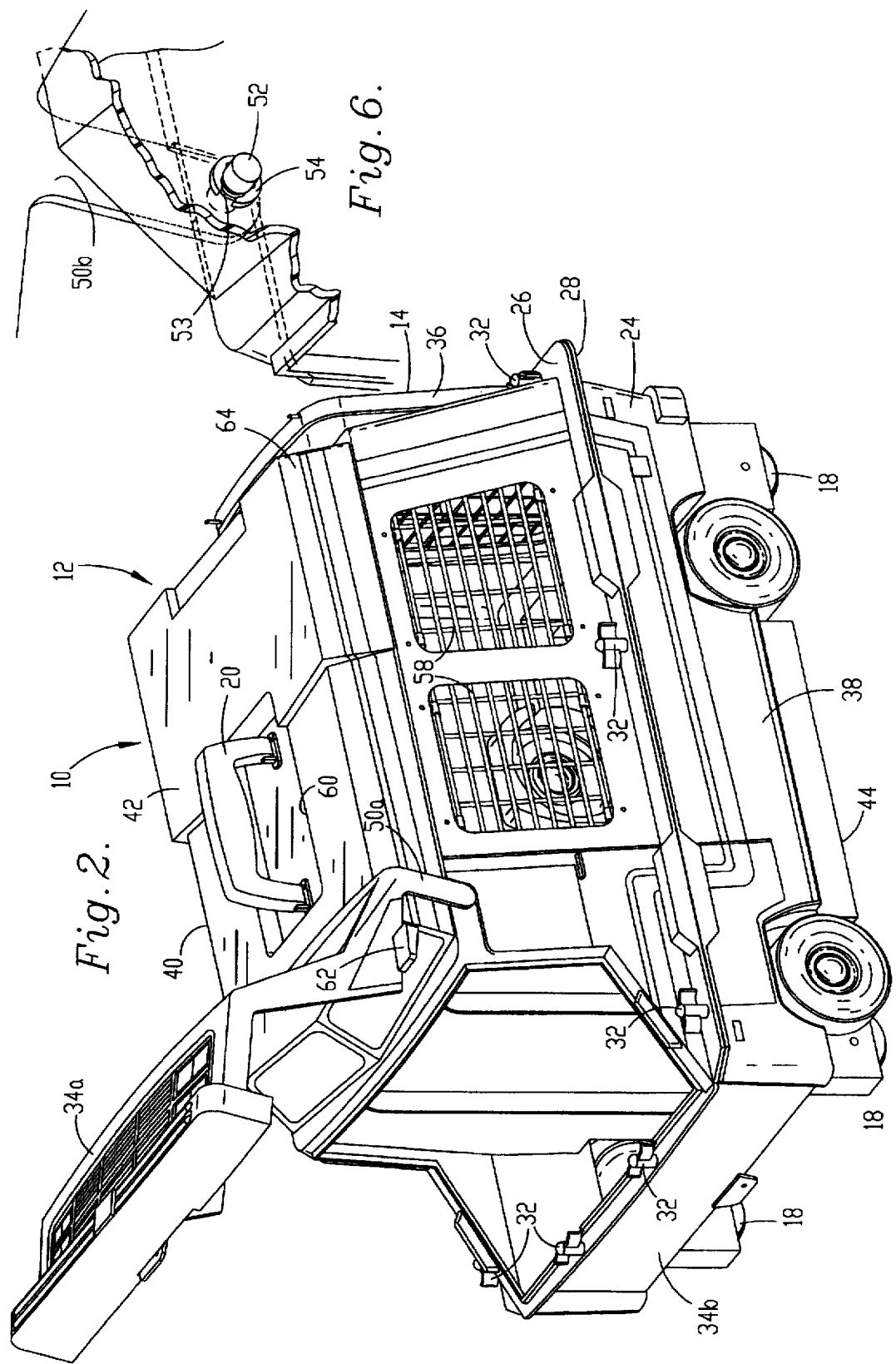
FIG. 2 is a view of the pet kennel of FIG. 1 but with the hinged front wall shown in the open position to reveal the storage compartment.

When secured together, sections 22, 24 cooperatively present front wall 34, rear wall 36, left wall 38, right wall 40, top wall 42 and bottom wall 44. Interior wall 16 is received within housing 12 with a pet compartment 46 defined in housing 12 between interior wall 16 and rear wall 36. Storage compartment 48 is defined in housing 12 between interior wall 16 and front wall 34 as best illustrated in FIG. 2.

Front wall 34 includes compartment door 34a and stationary portion 34b formed as part of lower section 24. Compartment door 34a includes hinge extensions 50a and 50b extending rearwardly from opposed sides of door 34a adjacent the upper edge thereof. As illustrated in FIG. 6, pivot pins 52 extend inwardly from the distal ends of extensions 50a,b respectively and are received in corresponding pivot holes 53 defined in left and right walls 38, 40. Snap rings 54 retain pivot pins 52 within holes 53. With this configuration, door 34a is hingedly coupled with housing 12 and pivots upwardly to the open position as best illustrated in FIG. 2.

The open position allows access to storage compartment 48 for storing cans of pet food, water bottles and other pet supplies. It will also be appreciated that interior wall 16 could be provided with an opening allowing access by a pet in pet compartment 46 to food and water positioned in storage compartment 48. Compartment door 34a pivots downwardly under the bias of gravity to the closed position as illustrated in FIG. 1. In this position, door 34a overlaps stationary portion area 34b in order to enclose storage compartment 48.

Rear wall 36 includes structure defining pet transfer opening 56 which allows access to pet compartment 46. Conventional wire mesh access door 14 is hingedly coupled with housing 12 to close pet transfer opening 56 and can be latched in the closed position. Left and right side walls 36, 38 each include ventilation openings 58 for providing ventilation to pet compartment 46.

Top wall 42 includes structure defining handle recess 60 with handle 20 pivotally coupled therein. When not in use, handle 20 lies flush within recess 60 but can be accessed for lifting or pulling kennel 10.

Figure 3:
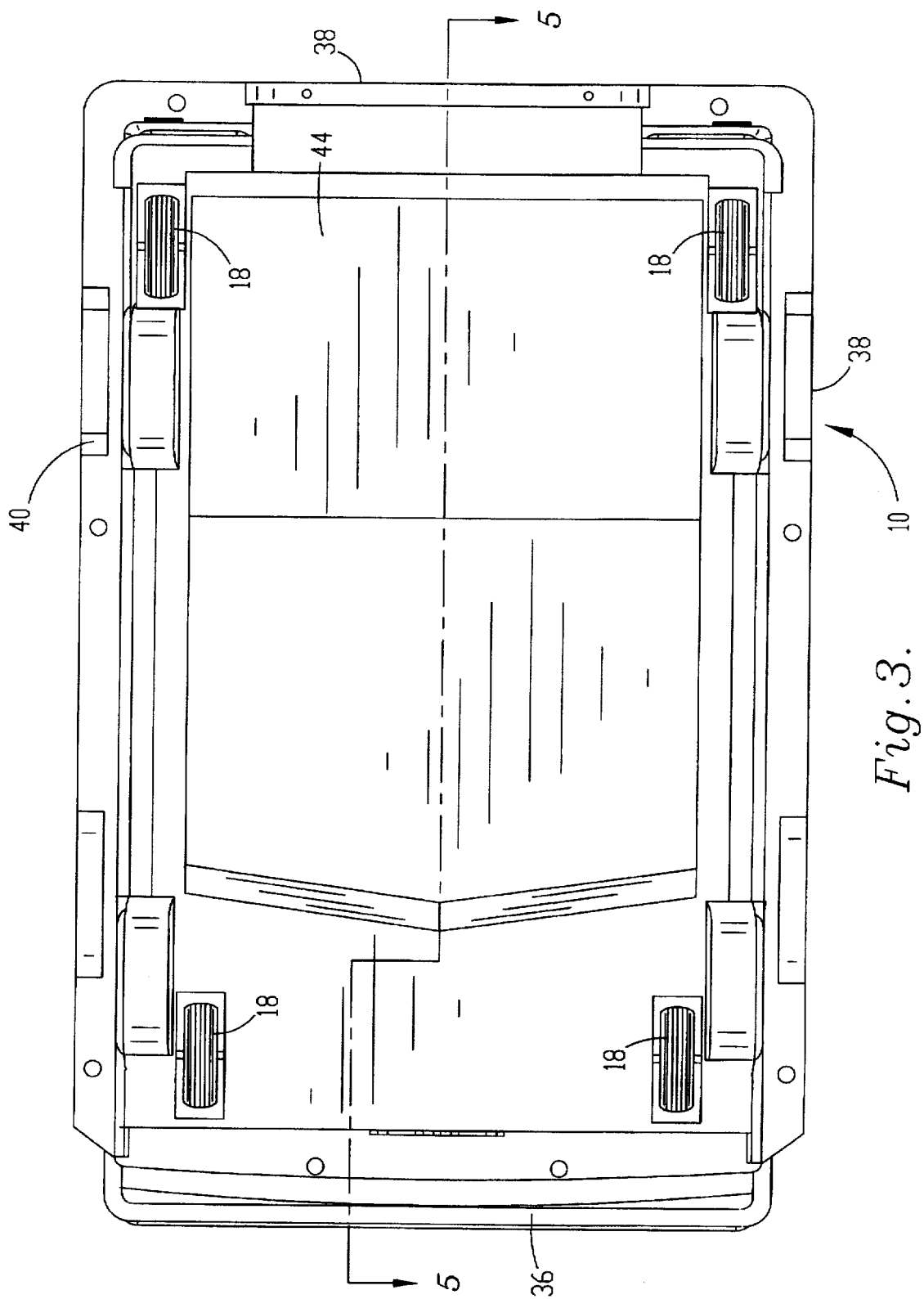
FIG. 3 is a bottom plan view of the pet kennel of FIG. 1.

Bottom wall 44 as best viewed in FIGS. 3 and 5 includes wheels 18 that rollably support kennel 10. This allows kennel 10 to be easily rolled without the need for lifting which can be a problem especially with a heavy pet inside. The rolling movement can be achieved by using handle 20 or by attaching a pull strap as desired to kennel 10. Bottom wall 44 is also configured complementally with top wall 42 in order to allow a plurality of kennels 10 to nest and interlock, as explained further herein.

As best viewed in FIG. 1, the structure of housing 12 is configured to present the appearance of a vehicle which, in this embodiment, is the configuration of a van. It will be appreciated that the present invention encompasses other vehicle configurations such as trucks, cars, boats and the like. More particularly, front wall 34 is configured as the front of the vehicle including windshield, windshield wipers, hood, grill, head lamps, bumper and license plate as illustrated in FIG. 1. Advantageously the license plate presents a surface for placement of identifying information such as the pet's name, owner's name, address, telephone number and the like. It will also be noted that projection 62 integral with compartment door 34a resembles a side view mirror and functions as a knob for lifting compartment 34a.

Similarly, side walls 38, 40 are configured to present the appearance of the side of the vehicle including passenger doors and the tires of the vehicle. Moreover, the structure of housing 12 is such that ventilation openings 58 are configured to present the appearance of side windows of the vehicle.

Top wall 42 is configured to present the appearance of the roof of the vehicle. As is common with most vehicles, the roof presents a domed configuration and in the case of the van presents an upraised portion 64. Bottom wall 44 is configured complementally with this upraised portion along with other surfaces of top wall 42. In this way, when a plurality of kennels 10 are stacked, the bottom wall of one kennel receives the top wall of the lower kennel thereby nesting and thereby interlocking to prevent sidewise movement and possible tipping. Thus, this feature presents a distinct advantage over the prior art in which flat surfaces engage when kennels are stacked. These prior art flat surfaces can allow one kennel to slide on the other presenting a tipping hazard.

Those skilled in the art will appreciate that the present invention encompasses many variations in the preferred embodiment described herein. As an example in addition to those already mentioned, the simulated tires of the vehicle could be replaced with the rollable wheels instead of having separate wheels. Having thus described the preferred embodiment of the present invention, the following is claimed as new and desired to be secured by Letters Patent:

I claim:

1. A pet kennel comprising:

a housing composed of synthetic resin material and presenting an upper section detachably coupled with a lower section, each section presenting first and second opposed end walls and first and second opposed side walls, said upper section presenting a top wall and said lower section presenting a bottom wall;

means defining a pet transfer opening in one of said walls;

a latchable door hingedly coupled with said housing for selectively opening and closing said transfer opening;

structure configuring said housing as a model simulating the appearance of a self-propelled vehicle selected from the group consisting of an automotive van, car and a truck including means configuring said first end wall as simulating the vehicle front, said first and second side walls as simulating the vehicle left and right sides respectively and said top wall as simulating the vehicle roof; and a handle coupled with said top wall for lifting said kennel.

2. The kennel as set forth in claim 1 further including an interior wall positioned between said end walls respectively defining a pet compartment and a storage compartment, said kennel including means shiftably coupling said end wall adjacent said storage compartment with said housing for selective shifting between open and closed positions relative to said storage compartment.

3. The kennel as set forth in claim 2, said means shiftably coupling including means hingedly coupling said first end wall with said housing adjacent said top wall for gravity bias of said first end toward said closed position.

4. The kennel as set forth in claim 1, said housing including ventilation openings defined in at least one of said side walls, said structure including means configuring said ventilation openings as simulating the appearance of side windows of the vehicle.

5. The kennel as set forth in claim 1 further including wheels coupled with said lower wall for rollably supporting said kennel.

6. The kennel as set forth in claim 1, said structure including means configuring said bottom wall complementally with said upper wall in order to receive said upper wall for nesting support of a plurality of said kennels.

7. The kennel as set forth in claim 6, said bottom wall being configured for receiving a portion of the top wall of another of said kennels when stacked thereby interlocking stacked kennels in order to prevent slidable movement.

8. The pet kennel as set forth in claim 1, said interior wall being separate from said housing.

9. The pet kennel as set forth in claim 1, said top wall including structure defining a handle-receiving recess, said handle being coupled with said top wall and received within said recess.

* * * * *